(No Model.)
J. W. & J. E. MURRAY.
COVER FOR KITCHEN UTENSILS.
No. 426,844. Patented Apr. 29, 1890.
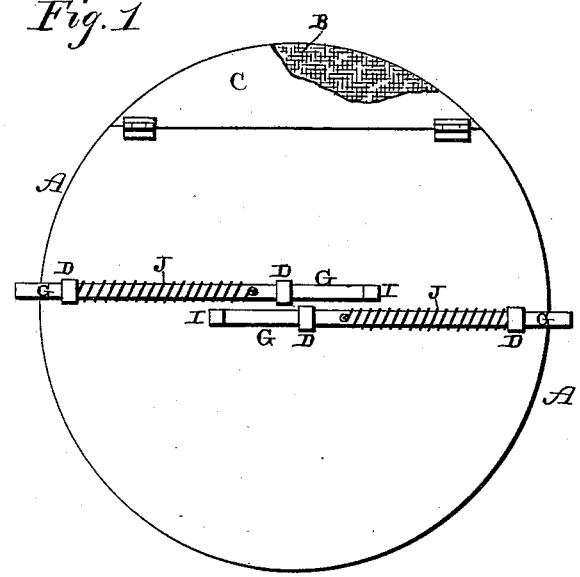
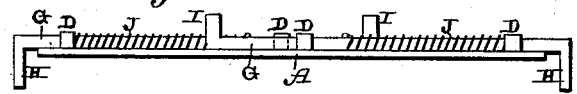
Witnesses:
E. P. Ellis,
B. Brockett,
Inventors.
Jas. W. Murray,
Jas. E. Murray,
per J. A. Lehmann, Atty.

UNITED STATES PATENT OFFICE.

JAMES WELLSLEY MURRAY AND JAMES EDMEN MURRAY, OF ST. GEORGE, NEW BRUNSWICK, CANADA, ASSIGNORS OF ONE-HALF TO SAMUEL THOMPSON MURRAY, OF SAME PLACE, AND JAS. CAMPBELL, OF KING'S PARISH, NEW BRUNSWICK, CANADA.

COVER FOR KITCHEN UTENSILS.

SPECIFICATION forming part of Letters Patent No. 426,844, dated April 29, 1890.

Application filed December 30, 1889. Serial No. 335,344. (No model.)

*To all whom it may concern:*

Be it known that we, JAMES WELLSLEY MURRAY and JAMES EDMEN MURRAY, of St. George, in the county of Charlotte and Province of New Brunswick, Canada, have invented certain new and useful Improvements in Covers for Kitchen Utensils; and we do hereby declare the following to be a full, clear, and exact description of the invention, such as will enable others skilled in the art to which it pertains to make and use it, reference being had to the accompanying drawings, which form part of this specification.

Our invention relates to an improvement in covers for in kitchen utensils; and it consists in the combination and arrangement of parts to be more fully described hereinafter, and particularly pointed out in the claim.

The object of our invention is to provide a cover which can be quickly and readily attached to cooking utensils and which is held in position by spring-actuated clamping-rods in such a manner that the utensil can be handled with perfect freedom without the slightest danger of having the hands burned by steam or hot water, as often occurs in draining water out of pots and other similar kitchen utensils.

Figure 1 represents a plan view of a cover embodying our invention. Fig. 2 is an edge view of the same.

A represents an ordinary cover—such as is used upon pots and other similar kitchen utensils—and which is provided with a strainer B, formed in or secured to one edge for draining off the water from the utensil to which the cover is applied. Loosely attached to this cover A is a lid C, which is here shown partly broken away, so as to show the strainer, and which is just large enough to cover the strainer, and which, when the utensil is tilted to one side, swings away from the strainer, so as to leave the water perfectly free to run out.

Placed in suitable guides D, which project above the top of the cover A, are the two endwise-movable rods G, which have their outer ends H bent downward, so as to form clamps to catch against the sides of the utensil to which the cover is applied and their inner ends I turned upward, so as to form handles. Applied to these rods in any suitable manner are springs J for returning the rods to position after they are left free to move. The inner ends of these rods pass each other, as shown, and form a handle at the center of the cover, so as to enable the cover to be handled with perfect ease. When these two upwardly-turned points I are pressed toward each other, the rods are forced endwise, so as to cause their clamping ends H to move outwardly away from opposite sides of the pot or kettle, and thus leave the cover free to be removed.

In placing the cover upon a pot or other utensil it is only necessary to catch hold of the two upwardly-turned ends I and press them slightly together and then place the cover upon the utensil and release the ends I, when the springs will cause the downwardly-turned ends H to tightly clamp the opposite sides of the utensil.

A cover constructed as above described is especially useful where the water is to be drained off of vegetables, meats, and other such articles and serves to protect the hands of the operator, so as to prevent them from being scalded by the steam which arises from the water either while in the utensil or while it is being poured off.

Having thus described our invention, we claim—

The combination, with a cover for cooking utensils, of endwise-movable rods applied thereto, having their outer ends turned downward to clasp the utensil, and their inner ends turned upward to form handles, and springs which engage and normally press the rods inward, substantially as shown and described.

In testimony whereof we affix our signatures in presence of two witnesses.

JAMES WELLSLEY MURRAY.
JAMES EDMEN MURRAY.

Witnesses:
JAMES CHIPMAN MCADAM,
SAMUEL DODD.